United States Patent
Günster et al.

(10) Patent No.: US 8,020,388 B2
(45) Date of Patent: Sep. 20, 2011

(54) METHOD FOR INCREASING THE EFFICIENCY OF A COMBINED GAS/STEAM POWER STATION WITH INTEGRATED GASIFICATION COMBINED CYCLE

(75) Inventors: Werner Günster, Weisendorf (DE); Erik Wolf, Röttenbach (DE); Gerhard Zimmermann, Höchstadt/Aisch (DE)

(73) Assignee: Siemens Aktiengesellschaft, Munich (DE)

( * ) Notice: Subject to any disclaimer, the term of this patent is extended or adjusted under 35 U.S.C. 154(b) by 867 days.

(21) Appl. No.: 11/990,034

(22) PCT Filed: Jul. 26, 2006

(86) PCT No.: PCT/EP2006/064693
§ 371 (c)(1),
(2), (4) Date: Feb. 5, 2008

(87) PCT Pub. No.: WO2007/017387
PCT Pub. Date: Feb. 15, 2007

(65) Prior Publication Data
US 2010/0146929 A1 Jun. 17, 2010

(30) Foreign Application Priority Data
Aug. 5, 2005 (EP) .................................. 05017062

(51) Int. Cl.
*F02C 6/08* (2006.01)
*F02C 6/18* (2006.01)
*F02C 3/28* (2006.01)

(52) U.S. Cl. ........................... 60/772; 60/785; 60/39.182

(58) Field of Classification Search ..................... 60/772, 60/785, 728, 39.12, 39.182
See application file for complete search history.

(56) References Cited

U.S. PATENT DOCUMENTS

| 4,907,405 | A  | * | 3/1990  | Polizzotto ...................... 60/772    |
|-----------|----|---|---------|---------------------------------------------|
| 5,437,150 | A  |   | 8/1995  | Latham et al.                               |
| 5,459,994 | A  | * | 10/1995 | Drnevich ..................... 60/39.12     |
| 6,141,950 | A  | * | 11/2000 | Smith et al. ................ 60/39.182     |
| 6,588,212 | B1 | * | 7/2003  | Wallace et al. ................. 60/772     |
| 6,824,575 | B1 |   | 11/2004 | Otomo et al.                                |
| 7,284,362 | B2 | * | 10/2007 | Marin et al. ............... 60/39.182      |
| 7,584,599 | B2 | * | 9/2009  | Benz et al. ................... 60/39.12    |

FOREIGN PATENT DOCUMENTS

| DE | 0634562 A2   | 1/1995 |
| DE | 19940763 A1  | 3/2000 |
| FR | 2298596      | 8/1996 |
| JP | 08014062 A   | 1/1996 |
| JP | 082118891 A  | 8/1996 |

* cited by examiner

*Primary Examiner* — Ted Kim

(57) ABSTRACT

The invention relates to a method for increasing the efficiency of a combined gas/steam power station (10) with integrated gasification combined cycle. Said power station comprises a gas turbine compressor (14) and an air-separation unit (18) having a defined working pressure. Compressed air is removed from the gas turbine compressor (14) at a pressure level that is adapted to the working pressure of the air-separation unit (18). The removed air is then supplied to the air-separation unit (18) where the air is broken down into its individual constituents, especially oxygen and nitrogen. The nitrogen produced in the air-separation unit (18) is removed from the air-separation unit and at least a part of the removed nitrogen quantity is used as a coolant in the gas/steam power station in order to improve its efficiency.

1 Claim, 3 Drawing Sheets

US 8,020,388 B2

METHOD FOR INCREASING THE EFFICIENCY OF A COMBINED GAS/STEAM POWER STATION WITH INTEGRATED GASIFICATION COMBINED CYCLE

CROSS REFERENCE TO RELATED APPLICATIONS

This application is the US National Stage of International Application No. PCT/EP2006/064693, filed Jul. 26, 2006 and claims the benefit thereof. The International Application claims the benefits of European application No. 05017062.0 filed Aug. 5, 2005, both of the applications are incorporated by reference herein in their entirety.

FIELD OF INVENTION

The invention relates to a method for increasing the efficiency of a combined gas and steam power generating plant, or a gas and steam turbine power generating plant, as the case may be, with integrated fuel gasification, which has a gas turbine compressor and an air fractionation plant with a predetermined operating pressure.

BACKGROUND OF THE INVENTION

In the last decade, a large number of power generating plants were constructed worldwide, upon which is based a combined gas and steam turbine process, and by which the pollutant emission can be significantly reduced. These power generating plants are designated in technical jargon as combined cycle power generating plants.

In a subform of the combined cycle power generating plant, in the so-called IGCC power generating plants ("IGCC" is an abbreviation for "Integrated Gasification Combined Cycle"), the combined cycle power generating plant additionally has an integrated fuel gasification, by means of which a liquid or solid fuel, for example hard coal, is converted in a gasifier into a synthesis gas, which is then combusted in a gas turbine. As a rule, a purification of the synthesis gas takes place before the combustion. Generally speaking, pollutants are separated before the combustion in this manner, or arise hardly at all in the first place.

Oxygen is required for the gasification of the fuels into synthesis gas. For the producing of the oxygen, IGCC power generating plants have air fractionation plants in which particularly nitrogen is produced from the environmental air by fractional distillation, in addition to the required oxygen. The synthesis gas has to be cooled down before the further treatment. In this connection, a steam develops, which contributes to electric power generation in the steam turbine of the IGCC power generating plant. After the cooling down of the gas, first filters keep back ash particulate, then carbon dioxide can also be extracted, if required. Other pollutants, such as sulfur compounds or heavy metals, are also bound by chemical and physical processes. As a result of this, the required fuel cleanliness for the operation of the gas turbines and for low emissions of the IGCC power generating plant is realized.

The synthesis gas is mixed with nitrogen from the air fractionation plant, and/or with water steam, before the combustion chamber of the gas turbine, in order to suppress the formation of nitrogen oxide. The working gas which then ensues from the combustion with air is expanded in the turbine stages of the gas turbine.

After expansion of the working gas in the gas turbine and subsequent waste heat utilization in a steam generator, the flue gas is discharged to the atmosphere.

The steam flows from the crude gas and flue gas cooling are combined and, together, fed to the steam turbine. After the expansion in the steam turbine, the steam is condensed via a condenser, and the condensate is returned via the feed water tank to the water or steam circuit, as the case may be.

The gas and the steam turbine (a combined cycle power generating plant, or an IGCC power generating plant, as the case may be) are coupled to a generator in which the rotational work of the turbines is converted into electrical energy.

Combined cycle power generating plants, or IGCC power generating plants, as the case may be, are constantly being developed. In this connection, the aim is pursued, inter alia, of constantly increasing the efficiency or the power output of these power generating plants, as the case may be.

SUMMARY OF INVENTION

The invention is based on the problem of disclosing a method for increasing the efficiency of a combined cycle power generating plant in the form of an IGCC power generating plant, by which the efficiency can be more noticeably increased in relation to known methods.

This problem is solved according to the invention by the method mentioned at the start for increasing the efficiency of a combined gas and steam power generating plant with integrated fuel gasification (IGCC power generating plant), which has a gas turbine compressor and an air fractionation plant with a predetermined operating pressure, in which compressed air is extracted from the gas turbine compressor at a pressure level which is adapted to the operating pressure of the air fractionation plant, in which the extracted air is then fed to the air fractionation plant, in which the air is broken down into its individual component parts, especially into oxygen and nitrogen, the nitrogen produced in the air fractionation plant is extracted from the air fractionation plant, and at least a part of the extracted nitrogen volume is used as cooling medium. The cooling air which is saved by this leads to an increase in efficiency.

According to the invention, air which is compressed in the gas turbine compressor, with a pressure level which is adapted to the operating pressure of the air fractionation plant, is fed to the air fractionation plant. For adaptation to the operating pressure of the air fractionation plant, this already compressed air, therefore, does not need to be compressed like the rest of the air which is fed via a compressor from the environment into the air fractionation plant, or is compressed in the air fractionation plant, as the case may be.

According to the invention, in this case a part of the air, or even all of the air, which is to be fed to the air fractionation plant, can be extracted from the gas turbine compressor. The power and efficiency loss which accompanies the air fractionation is, therefore, noticeably reduced.

In the air fractionation plant, nitrogen in particular is produced from the air by fractional distillation, in addition to the oxygen required for the gasification of the fuels. The nitrogen which is produced in the air fractionation plant, which has a low temperature owing to the fractional distillation (cryogenic air fractionation) undertaken in the air fractionation plant, is extracted according to the invention from the air fractionation plant, wherein at least a part of the extracted nitrogen volume is used as cooling medium in the IGCC power generating plant, in order to increase its efficiency.

Generally speaking, a cooling medium is ultimately provided by means of the method according to the invention, which can be produced without appreciable losses for the efficiency of the IGCC power generating plant. This cooling medium produced in this way according to the invention can be used for the realization of cooling processes which aim to increase the efficiency or the power of the IGCC power generating plant, as the case may be. The method according to the invention is especially advantageous if there is a comparatively low operating pressure of the air fractionation plant, and consequently also a low nitrogen delivery pressure, in which an energy conversion by expansion of the nitrogen is not practical.

The problem mentioned at the start is solved further according to the invention by a method for increasing the efficiency of a combined gas and steam power generating plant with integrated fuel gasification, which has a gas turbine compressor and an air fractionation plant with a predetermined operating pressure, in which compressed air is extracted from the gas turbine compressor at a pressure level which is adapted to the operating pressure of the air fractionation plant, the extracted air is then fed to the air fractionation plant in which the air is broken down into its individual component parts, especially into oxygen and nitrogen, the nitrogen which is produced in the air fractionation plant, is extracted from the air fractionation plant, and at least a part of the extracted nitrogen volume is heated, and, after heating, is expanded in a further turbine of the combined gas and steam power generating plant with integrated fuel gasification, in order to increase its efficiency. In this case, the utilizable rotational work which develops during the expansion improves the efficiency of the plant.

As distinct from the aforementioned first method according to the invention, this method is especially advantageous when the operating pressure of the air fractionation plant, and, as a result, the nitrogen delivery pressure, have an average pressure level. An energy conversion is then practical by expansion of the nitrogen in a further turbine, preferably in the form of an expander. After expansion, the nitrogen according to the method described above can be used as cooling medium.

Preferably, in this case, for the heating of the part of the extracted nitrogen volume, thermal energy of the extracted, compressed air is transmitted via a heat exchanger to the part of the nitrogen volume which is produced.

In an advantageous development of the method according to the invention, the part of the nitrogen volume produced which is used as cooling medium is introduced into the gas turbine compressor in order to cool air compressed in the gas turbine compressor by mixing with the part of the nitrogen volume which is produced. By the cooling of the air compressed in the gas turbine compressor, which is undertaken like this according to the invention, the efficiency of the IGCC power generating plant can be noticeably increased.

For cooling air which is compressed in the gas turbine compressor, in a practical development of the method according to the invention thermal energy of the compressed air is transmitted via a heat exchanger to the part of the produced nitrogen volume which is used as cooling medium. Therefore, in contrast to the aforementioned advantageous development, a cooling of the air which is compressed in the gas turbine compressor is enabled according to the invention by an indirect heat transfer by means of a heat exchanger, which results in a noticeable increase in the efficiency.

In a further advantageous development of the method according to the invention, the part of the extracted nitrogen volume which is used as cooling medium is mixed with air which is inducted by the gas turbine compressor, in order to cool the inducted air. According to the invention, the air to be compressed in the gas turbine compressor can be already cooled in this way by means of the cold nitrogen before compression. As an alternative to the direct mixing, in a practical development of the method according to the invention, thermal energy of the inducted air can be transmitted via a heat exchanger to the part of the extracted nitrogen volume which is used as cooling medium, for cooling the inducted air.

In a further practical development of the method according to the invention, the part of the extracted nitrogen volume which is used as cooling medium can also be used alternatively as additional cooling medium for a condenser of a steam turbine of the combined gas and steam power generating plant with integrated fuel gasification, as a result of which the expansion back pressure after the last steam turbine stage is further reduced, and so a power output gain and an improvement of the steam turbine efficiency can be achieved.

BRIEF DESCRIPTION OF THE DRAWINGS

The method according to the invention is subsequently explained in detail with reference to schematic views of the construction of an IGCC power generating plant. In the drawing.

DETAILED DESCRIPTION OF INVENTION

Figure 1:
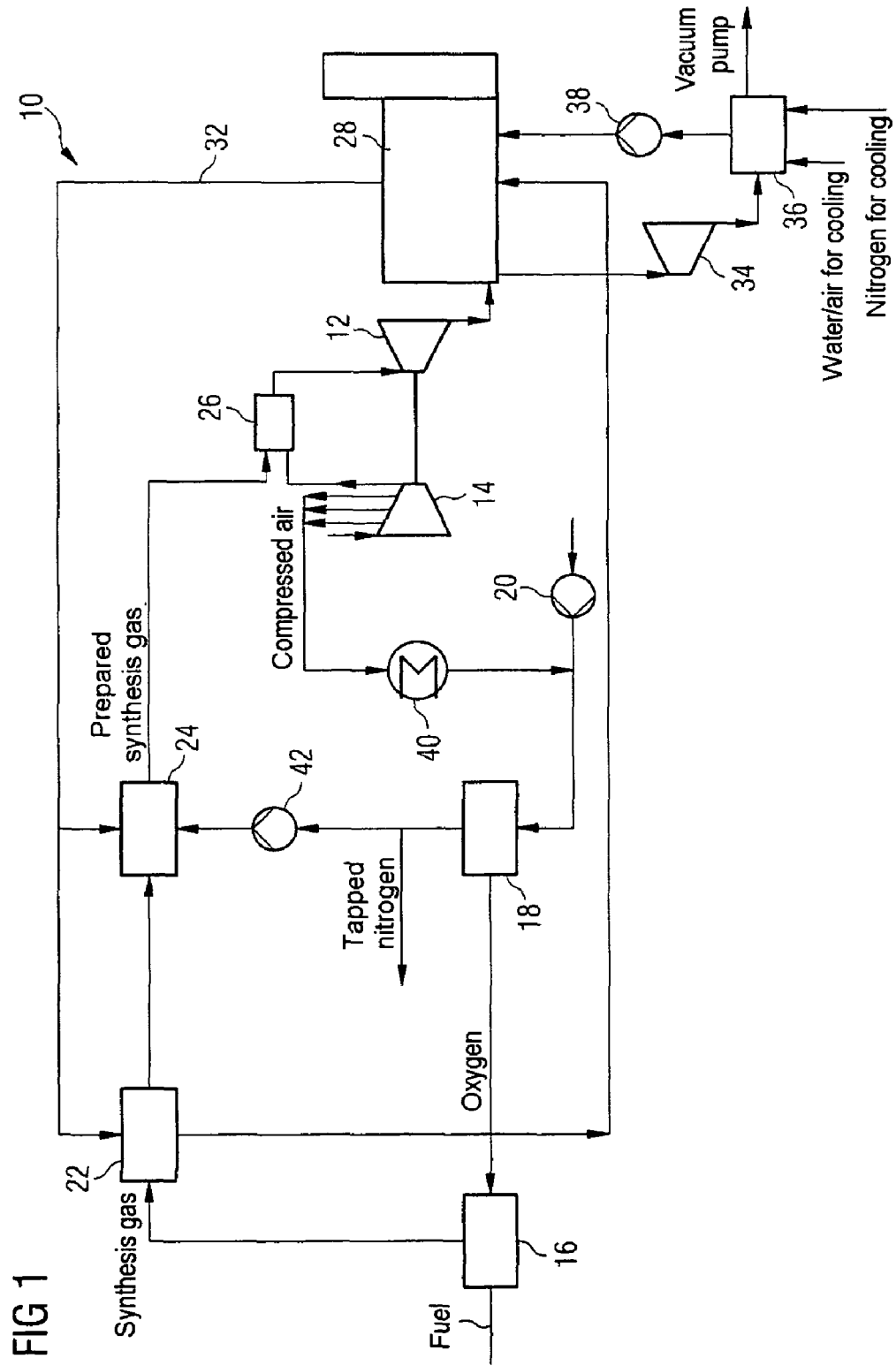
FIG. 1 shows a schematic view of a combined gas and steam power generating plant with integrated fuel gasification (IGCC power generating plant)

The IGCC power generating plant 10, which is shown schematically in FIG. 1, comprises inter alia a gas turbine 12 and a gas turbine compressor 14 connected ahead of the gas turbine 12. Fuel, such as hard coal, is gasified in a gasification unit 16 for the production of a synthesis gas. The oxygen required for the gasification is produced in an air fractionation plant 18, in which oxygen is produced from air by fractional distillation. As a rule, the air is taken from the environment, and, by a gas turbine compressor and/or auxiliary compressor, is introduced via a compressor 20 into the air fractionation plant 18 and compressed to the pressures required for the fractional distillation.

The synthesis gas which is produced in the gasification unit 16 is cooled down in a synthesis gas cooling unit 22 before the further treatment, and is then fed to a gas purification unit 24. In the gas purification unit 24, filters (not shown) first hold back ash particulate, then carbon dioxide can also be extracted, if required. Other pollutants, such as sulfur compounds or heavy metals, are also bound by chemical and physical processes. Generally speaking, the fuel cleanliness required for the operation of the gas turbine 12 can be realized in this way. The purified synthesis gas is next combusted in a combustion chamber 26, and the working gas produced from the combustion with air flows into the gas turbine 12, to which is coupled a generator (not shown). After the working gas is expanded in the gas turbine 12 it is fed to a waste heat steam generator 28 in order to utilize the heat which is contained in the working gas to produce steam. The waste heat steam generator 28 is integrated into a steam circuit 32, through which inter alia the steam produced during the cooling down of the synthesis gas in the synthesis gas cooling unit 22 is fed to the waste heat steam generator 28. The steam which is produced by the cooling down of the synthesis gas and the working gas is expanded in a steam turbine 34 which is coupled to a generator (not shown) to produce electrical energy. After the expansion in the steam turbine 34, the steam is condensed by a condenser 36, and the condensate is returned via a feed water pump 38 to the waste heat steam generator 28, and so into the steam circuit 32.

There is provision according to the invention to feed to the air fractionation plant 18 air which is already compressed in the gas turbine compressor 14, which has a pressure level which is adapted to the operating pressure of the air fractionation plant 18, especially corresponding to this operating pressure value-wise, wherein the compressed air is pre-cooled, preferably via a heat exchanger 40, before entry into the air fractionation plant 18. For adaptation to the operating pressure of the air fractionation plant 18, the air which has already been compressed does not need to be compressed, therefore, like the rest of the air which is inducted into the air fractionation plant from the environment by the compressor 20 and compressed in the air fractionation plant 18, with accompanying lowering of the efficiency or power output, as the case may be. A part of the air, or even all of the air, which is to be fed to the air fractionation plant 18, can be extracted from the gas turbine compressor 14. The nitrogen produced in the air fractionation plant 18, which has a low temperature owing to the fractional distillation which is undertaken in the air fractionation plant 18, is extracted from the air fractionation plant 18 according to the invention and fed via a nitrogen compressor 42 to the synthesis gas flow, in order to suppress to a great extent the formation of nitrogen oxides.

Figure 2:
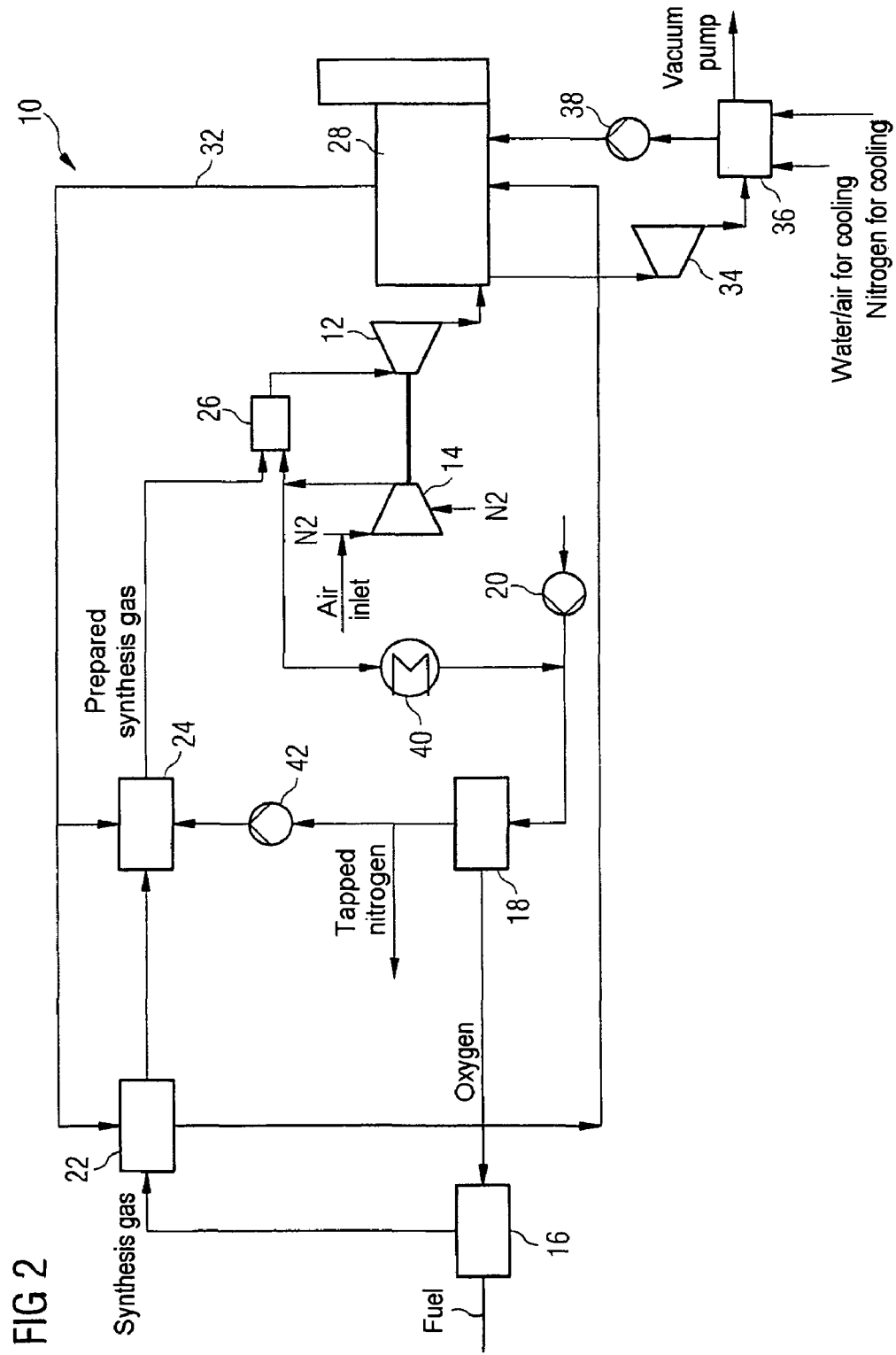
FIG. 2 shows a schematic view of the IGCC power generating plant from FIG. 1, which illustrates the cooling of compressed air by means of nitrogen from an air fractionation plant.

According to the invention, a part of the cold nitrogen to be fed to the gas purification unit 24, or gas conditioning, as the case may be, is tapped off between the air fractionation plant 18 and gas purification unit 24 so as to be used as cooling medium, with the aim of increasing the efficiency of the IGCC power generating plant by suitable cooling. According to the invention, this can take place inter alia as schematically shown in FIG. 2. For this purpose, the nitrogen volume which is provided as cooling medium is introduced directly into the gas turbine compressor 14 in order to cool air, which is compressed in the gas turbine compressor 14, by mixing with the tapped nitrogen.

Alternatively, the air which is to be compressed in the gas turbine compressor 14 can also be cooled via a heat exchanger (not shown), by which the air which is to be compressed is cooled against the tapped, cold nitrogen. As also schematically shown in FIG. 2, the tapped nitrogen can also be mixed with the induction air, in order to cool the inducted air. According to the invention, in this way the air to be compressed in the gas turbine compressor 14 is already cooled by means of the cold tapped nitrogen, before compression. Alternatively, the induction air can also be cooled in this case via a heat exchanger (not shown), by which the induction air is cooled against the tapped, cold nitrogen.

A further possible way of increasing the efficiency of the IGCC power generating plant according to the invention is to use the tapped, cold nitrogen as additional cooling medium for the condenser 36 of the steam turbine 34 in order to also achieve, via the condenser 36, a noticeable increasing of the efficiency, or power output, as the case may be.

Figure 3:
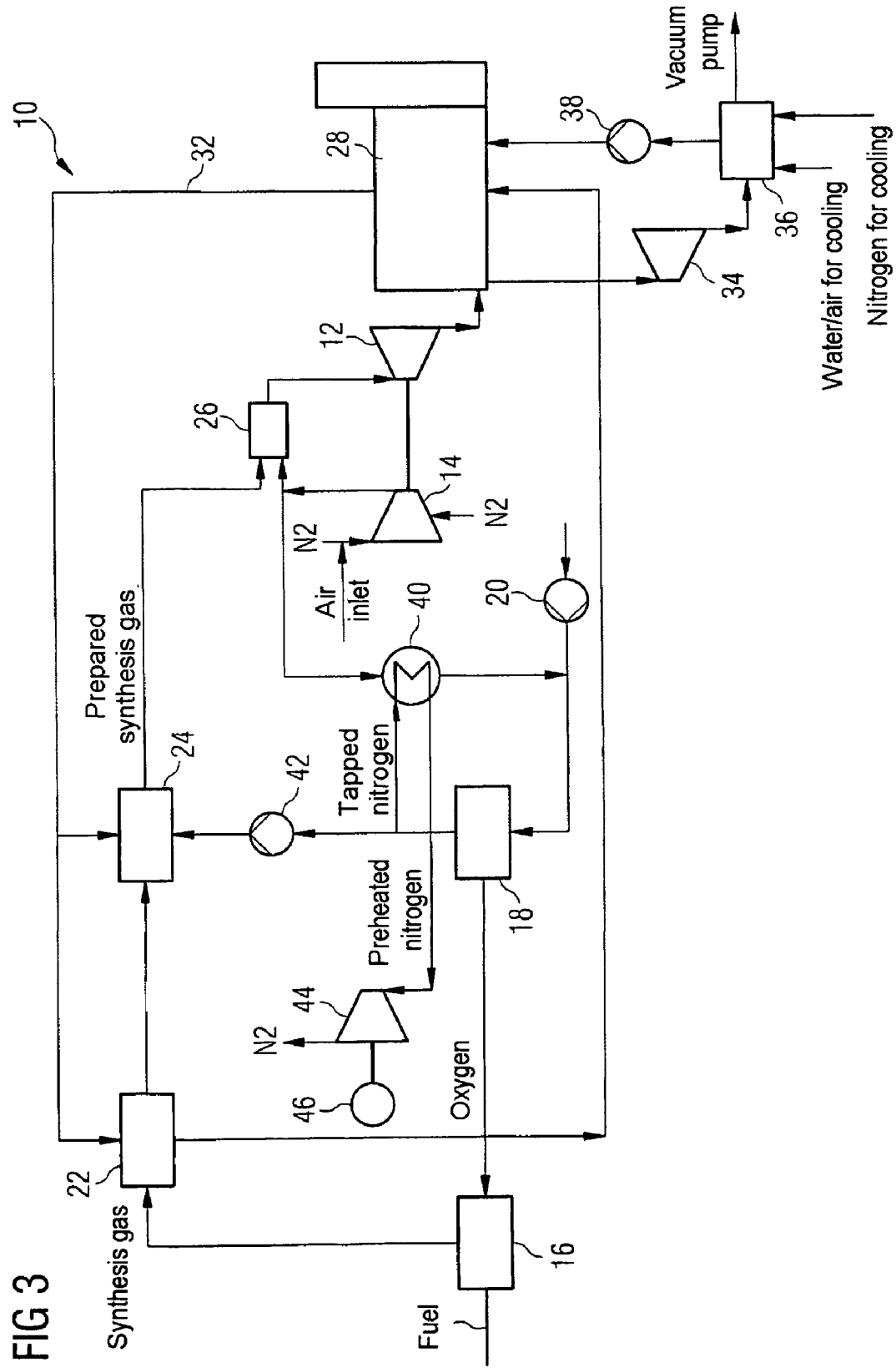
FIG. 3 shows a schematic view of the IGCC power generating plant from FIG. 1, which illustrates the increase in the efficiency of the IGCC power generating plant by expansion of nitrogen from an air fractionation plant.

FIG. 3 shows a schematic view of the IGCC power generating plant 10, which illustrates the increasing of the efficiency of the IGCC power generating plant 10 by expansion of nitrogen from an air fractionation plant 18.

As shown in FIG. 3, the tapped, cold nitrogen is routed through the heat exchanger 40, where it is heated against hot compressed air of the gas turbine compressor 14. After heating, the tapped nitrogen is expanded in a separate expander 44 in order to drive a generator 46 which is coupled to the expander 44. This method for increasing the efficiency is effectively applicable when the operating pressure of the air fractionation plant 18 and, as a result, the nitrogen delivery pressure, have an average pressure level. An energy conversion by expansion of the nitrogen in an expander 44 is then practical. After expansion, the nitrogen can be used as cooling medium, according to the aforementioned method.

The invention claimed is:

1. A method for increasing the efficiency of a combined gas and steam power generating plant with integrated fuel gasification where the plant has a gas turbine compressor and an air fractionation plant with a predetermined operating pressure, comprising:
    extracting compressed air from the gas turbine compressor at a pressure level adapted to the operating pressure of the air fractionation plant;
    feeding the extracted air to the air fractionation plant;
    breaking down the extracted air into at least component parts of nitrogen and oxygen via the air fractionation plant;
    extracting the broken down nitrogen from the air fractionation plant; and
    cooling components of the gas and power generating plant with at least a portion of the extracted nitrogen volume to increase the overall plant operating efficiency wherein the portion of the extracted nitrogen volume is used as additional cooling medium for a condenser of a steam turbine of the combined gas and steam power generating plant with integrated fuel gasification.

* * * * *